G. KARST AND A. J. NELSON.
TIME CONTROLLED REGULATOR.
APPLICATION FILED MAY 20, 1916.
1,321,103.
Patented Nov. 11, 1919.
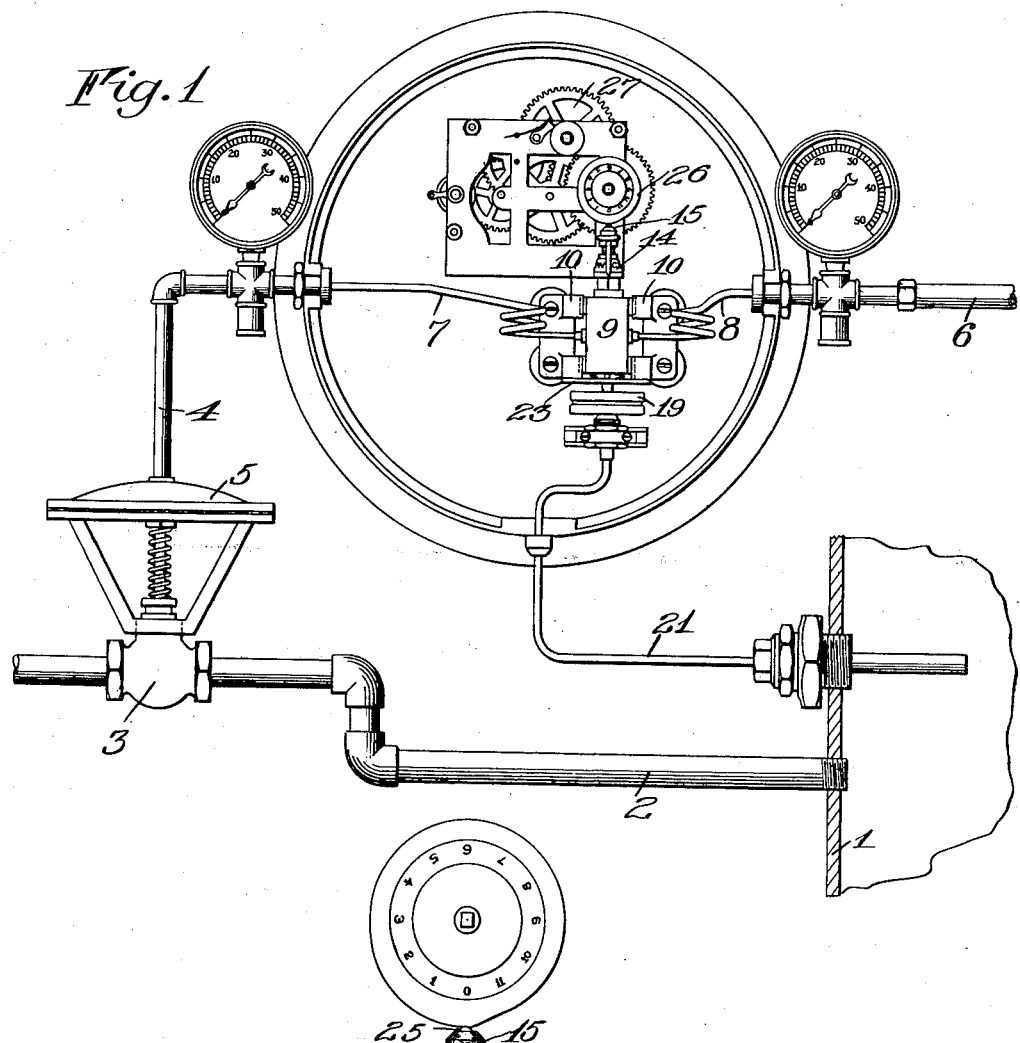
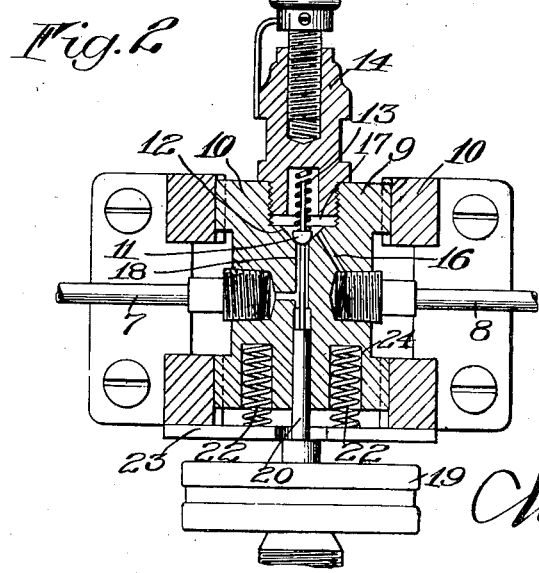
INVENTORS
George Karst
Albin J. Nelson
BY
their ATTORNEYS

UNITED STATES PATENT OFFICE.

GEORGE KARST AND ALBIN J. NELSON, OF ROCHESTER, NEW YORK, ASSIGNORS TO TAYLOR INSTRUMENT COMPANIES, OF ROCHESTER, NEW YORK, A CORPORATION OF NEW YORK.

TIME-CONTROLLED REGULATOR.

1,321,103.         Specification of Letters Patent.         Patented Nov. 11, 1919.

Application filed May 20, 1916. Serial No. 98,772.

*To all whom it may concern:*

Be it known that we, GEORGE KARST and ALBIN J. NELSON, of Rochester, in the county of Monroe and State of New York, have invented certain new and useful Improvements in Time-Controlled Regulators; and we do hereby declare the following to be a full, clear, and exact description of the same, reference being had to the accompanying drawings, forming a part of this specification, and to the reference-numerals marked thereon.

Our invention relates to a time controlled regulator and it has for its purpose to afford an improved construction which will be both accurately sensitive and readily adjustable, and acts to variably control a temperature within a chamber during a given interval of time. To these and other ends the invention consists in certain improvements and combinations of parts, all as will be hereinafter more fully described, the novel features being pointed out in the claims at the end of the specification.

In the drawings:

Figure 1 is a plan view of an apparatus showing the application of a preferred embodiment of the invention, and Fig. 2 is a vertical sectional view taken through the secondary valve and valve housing.

Similar reference characters throughout the several views indicate the same parts.

There are various ways in which the invention may be practicably adapted and for the purposes of the present application, we will describe a preferred embodiment which it will be understood is by way of example and not intended as confining the improvement to any of the detail features that are included as part of the structure. The invention is embodied in connection with an apparatus for controlling temperature within a heated chamber by admitting or cutting off the heating medium such as steam in accordance with the temperature within the chamber. This is accomplished by a heat expansive fluid, which through a capsular diaphragm, moves a secondary valve to control the admission of fluid pressure, for changing the position of the main controlling valve, through which the heating medium is admitted to the chamber, and the present improvement consists more particularly in providing for a time control of the temperature increase by varying the relative positions of the secondary valve and its valve seat during an adjustable interval of time by moving the valve seat bodily with respect to the valve that coöperates with it. 1 designates a section of a wall of a chamber or tank to which a heating medium, which may be in the form of steam, is supplied through an inlet pipe 2. The supply of heating fluid through the pipe 2 is governed by a main valve designated generally by 3. The main valve 3 is normally held open, and adapted to be closed by a fluid pressure supply from a pipe 4 which acts through a diaphragm in the diaphragm chamber 5 to close the main valve when the temperature in the chamber reaches a predetermined point. The fluid pressure controlling the main supply valve 3 is furnished from an inlet pipe 6, while 7 and 8 designate flexible connections leading from pipes 4 and 6 respectively to a valve housing 9 that is arranged for vertical sliding movement in a series of guides 10. Arranged within the valve housing 9 is a secondary valve 11 which is held normally against the valve seat 12 by a spring 13 while 14 is an extension threaded into the upper end of the housing 9 and carrying an adjustable threaded head 15. Under ordinary conditions when the valve 11 is closed against its seat 12, the fluid pressure supply is cut off and as soon as the valve 11 is opened in a manner that will presently appear, fluid pressure passes from the pipe 8 through the passage 16 into the chamber 17 and thence through passage 18 to the pipe 7 from which it enters the diaphragm chamber 5 and operates to close the main valve 3. The position of the valve 11 is controlled by a capsular diaphragm 19 arranged with its central portion substantially in alinement with the valve and carrying a rod 20 which engages the lower face of the valve and is also alined therewith. The diaphragm 19 connects with a tube 21 which leads within the chamber 1, being closed at its inner end and containing a suitable fluid that is expansible and contractible when subjected to hot and cold temperatures. It will be seen that as the temperature in the chamber 1 rises, the diaphragm 19 expands, causing the rod 20 to move upwardly and thus open the secondary valve 11 to permit the fluid pressure to effect corresponding movement of the main valve 3.

It is desirable that provision be made for permitting the temperature to rise a predetermined amount in a given interval of time, and with this object in view the valve housing 9 which contains the valve seat against which the secondary valve 11 engages, is arranged for movement bodily as already described and its movement is determined in the following manner by a time mechanism. The valve housing 9 is actuated upwardly by springs 22 which rest upon the stationary plate 23 and are arranged in recesses 24, while the upper end of the adjustable head 15 carries an anti-friction member 25 that engages a time controlled member preferably in the form of a rotary cam 26 driven by a clock mechanism designated generally by 27. The cam shown in the present arrangement is designed to accomplish the desired rise of temperature in a period of three hours although this may be otherwise arranged for any desired interval. During the time that the cam 26 is traveling from the position shown until the numeral 3 reaches the bottom point, the valve housing 9 will move constantly in an upward direction a slight extent, causing the valve seat 12 to follow the valve 11 and thus maintain the valve 11 in throttling relation with the valve seat during the interval for which the operation is set so that the heating medium will continue to be supplied to the chamber. After the valve housing 9 has reached the limit of its upward movement any further increase of temperature in the chamber to be controlled causes additional upward movement of the valve 11 thereby opening the port wider and admitting fluid pressure to close the main supply valve.

It will be apparent that other structures may be devised for carrying out the improvement without departing from the essential spirit of the invention which consists primarily in providing in a temperature controlling apparatus, a secondary valve having engagement with an independently movable valve seat, one of said members being controlled by a time mechanism while the other member is governed directly by the temperature within the chamber.

We claim as our invention:

1. In a time controlled regulator for governing temperature within a chamber, the combination with a main valve and a fluid pressure supply for effecting movement of said valve, of a secondary valve controlling said fluid pressure, a movable valve seat against which the secondary valve engages, a pressure operated diaphragm controlled by conditions within said chamber and effecting movement of one of said two last named parts, and a time controlled member acting to effect movement of the other of said parts.

2. In a time controlled regulator for governing temperature within a chamber, the combination with a main valve and a fluid pressure supply for effecting movement of said valve, of a secondary valve controlling said fluid pressure, a movable valve seat against which the secondary valve engages, a pressure operated diaphragm controlled by conditions within said chamber and effecting movement of the secondary valve and a time controlled member operatively associated with said valve seat and acting to effect movement thereof.

3. In a time controlled regulator for governing the temperature within a chamber, the combination with a main valve and a fluid pressure supply for effecting movement of said valve, of a secondary valve controlling said fluid pressure, a slidable valve seat against which the secondary valve engages, a pressure operated diaphragm controlled by conditions within said chamber and effecting movement of the secondary valve, and time mechanism acting to move said valve seat.

4. In a time controlled regulator for governing temperature within a chamber, the combination with a main valve and a fluid pressure supply for effecting movement of said valve, of a secondary valve controlling said fluid pressure, a slidably mounted housing, stationary guides on which the housing moves, a valve seat arranged in said housing for engagement with the aforesaid secondary valve, a pressure operated diaphragm controlled by conditions within the chamber and effecting movement of the secondary valve, and time mechanism acting to move said housing to change the position of the valve seat in a predetermined interval.

5. In a time controlled regulator for governing temperature within a chamber, the combination with a main valve and a fluid pressure supply for effecting movement of said valve, of a secondary valve controlling said fluid pressure, a slidably mounted housing, guides on which the housing moves, a valve seat arranged in said housing for engagement with the aforesaid secondary valve, a pressure operated diaphragm controlled by conditions within the chamber and effecting movement of the secondary valve, and a rotary time controlled cam in engagement with a part of said slidable housing and acting to move it and the valve seat a predetermined distance in a given interval.

6. In a time controlled regulator for governing temperature within a chamber, the combination with a main valve and a fluid pressure supply for effecting movement of said valve, of a slidably mounted housing having a valve seat therein, a time mechanism governing the position of said housing and valve seat, a secondary valve coöperating with said valve seat and movable independently of the housing, and a pressure operated diaphragm controlled by conditions within the chamber and effecting movement of the secondary valve independently of its seat.

7. In a temperature regulator, the combination with a main valve and a fluid pressure supply for effecting movement of said valve, of a secondary valve controlling said fluid pressure supply, a pressure operated diaphragm governed by conditions within a chamber to be controlled, the center of the diaphragm being in alinement with the secondary valve, a rod carried by said diaphragm in alinement and engagement with the secondary valve for operating it, a movable valve housing having a seat for engagement with the secondary valve, an extension on said housing in alinement with the secondary valve and diaphragm, and time mechanism having engagement with said extension.

8. In a temperature regulator, the combination with a main valve and a fluid pressure supply for effecting movement of said valve, of a secondary valve controlling said fluid pressure supply, a pressure operated diaphragm governed by conditions within the chamber to be controlled, the center of the diaphragm being in alinement with the secondary valve, a rod carried by said diaphragm in alinement and engagement with the secondary valve for operating it, a movable valve housing having a seat for engagement with the secondary valve, an extension on said housing in alinement with the secondary valve and diaphragm, and a time operated rotary cam in engagement with said extension.

GEORGE KARST.
ALBIN J. NELSON.

Witnesses:
  HARRIET L. AVERY,
  FRED K. TAYLOR.